Figures 1, 4:
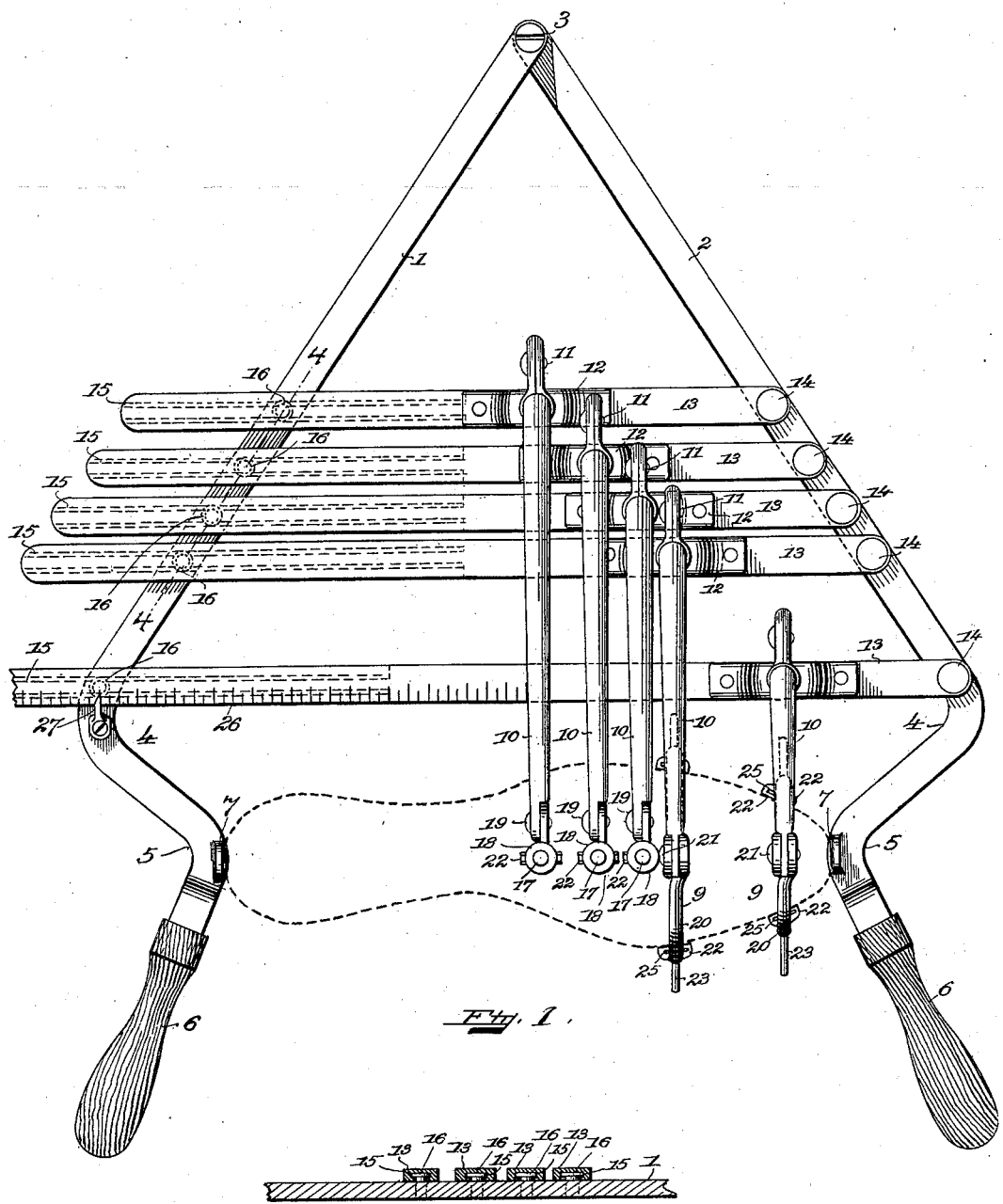

No. 655,228.

Patented Aug. 7, 1900.

C. B. HATFIELD.
MEASURING INSTRUMENT FOR LASTS, &c.
(Application filed Mar. 7, 1900.)

(No Model.)

2 Sheets—Sheet 1.

Witnesses:
John J. Collins
John F. C. Preinkert

Inventor:
Charles B. Hatfield,
By his attorneys
Phillip & Anderson

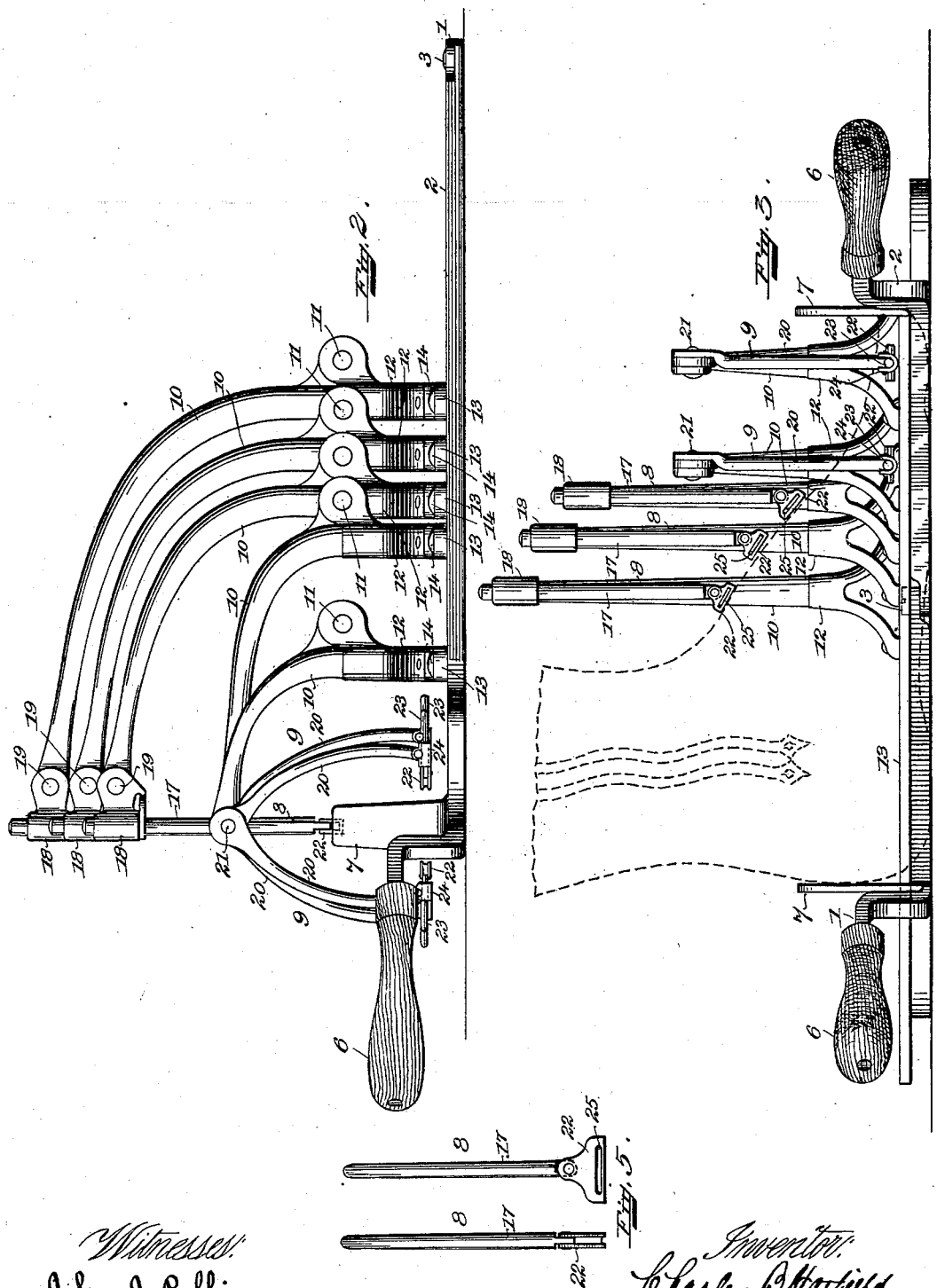

UNITED STATES PATENT OFFICE.

CHARLES B. HATFIELD, OF NEW YORK, N. Y.

MEASURING INSTRUMENT FOR LASTS, &c.

SPECIFICATION forming part of Letters Patent No. 655,228, dated August 7, 1900.

Application filed March 7, 1900. Serial No. 7,645. (No model.)

*To all whom it may concern:*

Be it known that I, CHARLES B. HATFIELD, a citizen of the United States, residing at New York city, in the county of New York and State of New York, have invented certain new and useful Improvements in Measuring Instruments; and I do hereby declare the following to be a full, clear, and exact description of the invention, such as will enable others skilled in the art to which it appertains to make and use the same.

The present invention relates to measuring instruments, and more particularly to measuring instruments employed in taking measurements of the human foot for the purpose of manufacturing lasts and boots and shoes.

In measuring the human foot for producing lasts it has been found desirable to take circumferential measurements, as around the waist, across the instep, and around the "ball" of the foot, and around the toes, usually several measurements being taken around the waist and instep at different points, one measurement across the ball and one measurement around the toes. It is essential that these measurements be taken at certain predetermined points along the foot and that the lasts produced should have the corresponding measurements at the same points. These points vary as to their relative distances apart according to the length of the foot; and it is the object of the present invention to produce a simple instrument by which the points of circumferential measurements will be accurately and uniformly located on the foot according to the length of the foot and which will enable the last-maker and the shoemaker to accurately determine the proper points in the last and shoe at which such measurements have been taken in a foot of a given length.

The present invention constitutes an improvement upon the device disclosed in Letters Patent of the United States No. 581,721, granted to me on the 4th day of May, 1897, and has for one object to greatly simplify the construction and to produce a portable device without the cumbersome frame-work and support for the foot, whereby it may be readily carried from place to place in measuring the feet of customers.

A further object of the invention is to so construct the same that the operation thereof in obtaining the length of the foot will simultaneously position the indicators or tape-holders at the various points required to take the circumferential measurements.

A further object of the invention is to simplify the mechanism for differentially moving the indicators or tape-holders.

To the above ends the present invention consists of the devices and combinations of devices which will be hereinafter described and claimed.

The present invention is illustrated in the accompanying drawings, in which—

Figure 1 shows my improved measurement-indicator in plan view with a portion of one of the indicator-bars broken off, the outline of a foot being shown in dotted lines. Fig. 2 shows a front elevation of the device. Fig. 3 shows a side elevation of the device with a foot therein in dotted lines, showing the operation of the indicators or tape-holders. Fig. 4 shows a sectional view on the line 4 4, Fig. 1, illustrating the connection of the indicator with one of the levers; and Fig. 5 shows a front and side elevation of one of the indicator tape-holders removed from its support.

Similar reference-numerals will be employed throughout the specification and drawings to designate corresponding parts.

In the drawings, 1 and 2 indicate a pair of levers which are pivotally connected at 3 in a manner which will permit them to have a movement toward and from each other. The levers 1 and 2 are preferably bent inwardly toward each other, as shown at 4, and thence outwardly, as shown at 5, and the free ends thereof provided with suitable handles 6 to be grasped by the hands of the operator in manipulating the instrument. Each of the levers carries at the angle formed by the bend 5 a vertical standard 7, one of which is arranged to engage the heel of the foot or last and the other the toe thereof in making measurements, as clearly shown in the drawings.

In the present embodiment of my invention I have provided it with three indicators or tape-holders for indicating the points of measurement at the waist and instep, one at the ball portion and another at the toe portion, and I have so connected them with the levers 1 and 2 that when said levers are moved to bring the standards 7 in contact with the toe and heel in obtaining the length measurement the several indicators will be differentially moved with relation to each other and properly positioned along the foot in accordance with the length thereof. This is accomplished in the instrument of the drawings as follows: The indicators 8 and 9 are each supported in overhanging curved arms 10, which are of such a length and height, as shown, to cause them to position the indicators with reference to the longitudinal medial line of the foot when the device is being used, as clearly shown in the drawings. The arms 10 are pivotally supported at 11 to short vertical standards or posts 12, which are secured to the indicator-bars 13, the bars 13 being pivotally connected at 14 to the lever 2 and extend therefrom in parallel alinement with each other across the lever 1.

It will be noted that any movement of the lever 2 toward or away from the lever 1 will impart a corresponding movement to the bars 13 and the arms 11, and by reason of the varying distances of the pivots 14 from the pivoted point 3 of the levers 1 and 2 such movements of the bars and arms will be a differential movement—that is, the arms 10 will move simultaneously with each other in the same direction and will also move varying distances or relatively to each other, which secures the proper positioning of the indicators according to the length of the foot being measured.

For the purpose of guiding and maintaining the bars 13 in parallelism with each other each of said bars on its under surface is provided with an undercut groove 15, in which engages a headed stud 16, carried by the lever 1. (See dotted lines, Fig. 1, and sectional view, Fig. 4.)

As shown in the drawings, the indicators 8 have but a single point of contact with the part along the medial line of the instep, while the indicators 9 each have two points of contact engaging the opposite sides of the ball and toe portions. The indicators 8 are carried by cylindrical stems 17, which are fitted to slide vertically in cylindrical bearings 18, pivotally connected, as at 19, with their arms 10, whereby they may be moved up and down to position them for insteps of varying heights.

The indicators 9 are formed of curved arms 20, which are pivotally connected at 21 to their supporting-arms 10, so as to move toward and from each other according to the varying width of the foot across the ball and toe portions thereof.

The indicators 8 and 9 may be provided with indicator-points only such as shown in my prior patent, hereinbefore referred to, to point out or mark the points where circumferential measurements are to be taken, or, as shown in the drawings, they may support tape-holders 22, which will be pivotally mounted to the ends of the indicators 8 and pivotally mounted upon stems 23, carried by cylindrical bearings 24, pivoted to the arms 20 of the indicators 9.

Each tape-holder 22 will be provided with a slot 25, through which an ordinary tape-measure may be passed and in which it will be held to be positioned by the movement of the indicators described to obtain the desired circumferential measurements.

Upon the bar 13, which is nearest the handles 6, will be placed a scale 26, and the lever 1 will carry a pointer 27, coöperating with the scale 26 and indicating the longitudinal measurement of the foot or last.

It is thought that the operation of my invention has been fully set forth in connection with the foregoing description of its form and arrangement, and a further description thereof is deemed unnecessary.

Having fully described my invention, I claim as new and desire to protect by Letters Patent of the United States—

1. In a measuring instrument for measuring feet and lasts, the combination with means for obtaining longitudinal measurements, of an indicator for locating a point of circumferential measurement, and means controlled by the operation of the instrument in obtaining longitudinal measurements for positioning the indicator to locate a point of circumferential measurement, substantially as described.

2. In a measuring instrument for measuring feet and lasts, the combination with means for obtaining longitudinal measurements, of a group of indicators for locating points of circumferential measurements, and means controlled by the operation of the instrument in obtaining longitudinal measurements for relatively positioning the indicators to locate the points of circumferential measurements, substantially as described.

3. In a measuring instrument for measuring lasts and feet, the combination with contact-points arranged to move toward and from each other to engage the heel and toe of a foot or last in obtaining longitudinal measurements, of indicators for locating points of circumferential measurements and means for differentially moving the indicators when the contact-points are moved, substantially as described.

4. In a measuring instrument for measuring feet and lasts, the combination with a pair of pivoted levers carrying contact-points to engage the toe and heel of a foot or last, of a series of bars pivoted to one lever and engaging guiding devices on the opposite lever, and a series of indicators for locating points of circumferential measurements carried by said bars, substantially as described.

In testimony whereof I affix my signature in presence of two witnesses.

CHARLES B. HATFIELD.

Witnesses:
  CHARLES B. HATFIELD, Jr.
  T. HART ANDERSON.